United States Patent
Osman et al.

(10) Patent No.: US 12,186,672 B2
(45) Date of Patent: Jan. 7, 2025

(54) SMS, PHONE AND VIDEO CALL SUPPORT WHILE GAMING

(71) Applicant: Sony Interactive Entertainment Inc., Tokyo (JP)

(72) Inventors: Steven Osman, San Mateo, CA (US); Olga Rudi, San Mateo, CA (US); Mahdi Azmandian, San Mateo, CA (US); Jorge Arroyo Palacios, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 163 days.

(21) Appl. No.: 17/817,171

(22) Filed: Aug. 3, 2022

(65) Prior Publication Data
US 2024/0042335 A1  Feb. 8, 2024

(51) Int. Cl.
| | |
|---|---|
| A63F 13/87 | (2014.01) |
| A63F 13/215 | (2014.01) |
| A63F 13/537 | (2014.01) |
| G06F 3/16 | (2006.01) |
| G06F 21/62 | (2013.01) |
| G10L 15/22 | (2006.01) |
| G10L 15/26 | (2006.01) |
| G10L 25/57 | (2013.01) |

(52) U.S. Cl.
CPC ............ *A63F 13/87* (2014.09); *A63F 13/215* (2014.09); *A63F 13/537* (2014.09); *G06F 3/165* (2013.01); *G10L 15/22* (2013.01); *G10L 15/26* (2013.01); *G10L 25/57* (2013.01)

(58) Field of Classification Search
CPC .. A63F 13/87; A63F 13/215; A63F 2300/572; A63F 2300/6072; G06F 21/6245
See application file for complete search history.

(56) References Cited

U.S. PATENT DOCUMENTS

| | | | | |
|---|---|---|---|---|
| 4,481,382 A | * | 11/1984 | Villa-Real | H04M 1/72516 |
| | | | | 455/418 |
| 9,888,211 B1 | * | 2/2018 | Browne | H04L 12/1827 |
| 11,082,465 B1 | * | 8/2021 | Chavez | G06V 40/18 |
| 11,522,841 B1 | * | 12/2022 | Lovitt | H04N 7/147 |
| 11,659,137 B1 | * | 5/2023 | Parampottil | G06T 5/75 |
| | | | | 348/14.12 |
| 2007/0026852 A1 | | 2/2007 | Logan et al. | |

(Continued)

FOREIGN PATENT DOCUMENTS

WO  WO-2020124371 A1 * 6/2020

OTHER PUBLICATIONS

"Video game" and "game" definitions from Merriam-Webster online dictionary. Accessed Sep. 16, 2024. Source: www.merriam-webster.com (Year: 2024).*

(Continued)

*Primary Examiner* — Steven J Hylinski
(74) *Attorney, Agent, or Firm* — John L. Rogitz; John M. Rogitz (57) ABSTRACT

Privacy of a conversation between a computer game player and an entity such as a person or virtual assistant is preserved by various techniques so that other players of the computer game who are not part of the conversation cannot apprehend the conversation. The conversation may be voice or txt but is not an online chat associated with the computer game.

13 Claims, 4 Drawing Sheets

(56) References Cited

U.S. PATENT DOCUMENTS

| | | | | |
|---|---|---|---|---|
| 2007/0143103 A1* | 6/2007 | Asthana | H04M 3/567 | |
| | | | 704/200 | |
| 2008/0297586 A1* | 12/2008 | Kurtz | H04L 12/1827 | |
| | | | 348/E7.083 | |
| 2009/0089685 A1* | 4/2009 | Mordecai | G06F 21/6245 | |
| | | | 348/E7.078 | |
| 2012/0327176 A1* | 12/2012 | Kee | H04N 7/15 | |
| | | | 348/E7.083 | |
| 2013/0346076 A1 | 12/2013 | Stewart et al. | | |
| 2014/0049593 A1* | 2/2014 | Pai | H04M 3/51 | |
| | | | 348/14.01 | |
| 2014/0176663 A1* | 6/2014 | Cutler | G06T 7/50 | |
| | | | 348/14.07 | |
| 2015/0074739 A1 | 3/2015 | Mountain | | |
| 2015/0097919 A1* | 4/2015 | Karimi-Cherkandi | | |
| | | | H04W 52/027 | |
| | | | 348/14.07 | |
| 2018/0190279 A1* | 7/2018 | Anderson | G10L 15/22 | |
| 2018/0352061 A1 | 12/2018 | Hosoi et al. | | |
| 2019/0232168 A1 | 8/2019 | Benedetto et al. | | |
| 2020/0162599 A1 | 5/2020 | Hardi | | |
| 2020/0365155 A1 | 11/2020 | Milden et al. | | |
| 2021/0132769 A1* | 5/2021 | Parikh | G06F 1/1677 | |
| 2021/0149441 A1* | 5/2021 | Bartscherer | G06F 1/1616 | |
| 2021/0218845 A1* | 7/2021 | Magi | G06F 3/013 | |
| 2021/0306561 A1* | 9/2021 | VanBlon | H04N 5/2621 | |
| 2022/0199079 A1* | 6/2022 | Hanson | H04L 51/02 | |
| 2022/0408059 A1* | 12/2022 | Stonehocker | H04N 7/147 | |
| 2023/0038109 A1* | 2/2023 | Braganza | G10L 25/51 | |

OTHER PUBLICATIONS

"International Search Report and Written Opinion", dated Jan. 12, 2024, from the counterpart PCT application PCT/US23/71293.

* cited by examiner

SMS, PHONE AND VIDEO CALL SUPPORT WHILE GAMING

FIELD

The present application relates generally to SMS, phone, and video call support while gaming.

BACKGROUND

Often while playing a multiplayer game, a player may receive a private phone call or video call with people other than the gamers the player is playing with. The player may also be on a multiplayer chat with the gamers the player is playing with, possibly using the chat features of the console.

SUMMARY

As understood herein, in the scenarios above people may wish to protect the privacy of private conversations in the context of multiplayer game play with chat and video. Additionally, support can be added to help receiving and sending text messages. Present principles protect the privacy and improve the accuracy of a digital conversation while playing a game online with others.

Accordingly, an assembly includes at least one processor configured with instructions to, during presentation of a computer simulation, detect that a conversation outside the computer simulation between a player of the computer simulation and at least one other person has commenced. The instructions are executable to, responsive to detecting that a conversation between a player of the computer simulation and at least one other person has commenced, execute at least one privacy-preserving technique within the computer simulation to preserve privacy of the conversation.

In non-limiting examples the processor is configured to detect that a conversation between a player of the computer simulation and at least one other person has commenced at least in part by detecting an audible sound that may include at least one phone ring tone. In addition, or alternatively, the processor may be configured to detect that a conversation between a player of the computer simulation and at least one other person has commenced at least in part by receiving from a chat system at least one indication of the conversation. Yet again, the processor can be configured to detect that a conversation between a player of the computer simulation and at least one other person has commenced at least in part by identifying at least one signal from a telephone's operating system or from a Bluetooth headset or from both a telephone's operating system and from a Bluetooth headset. In addition, or alternatively the processor may be configured to detect that a conversation between a player of the computer simulation and at least one other person has commenced at least in part by identifying voice activation of at least one digital assistant.

In some examples, the processor can be configured to execute the at least one privacy-preserving technique within the computer simulation at least in part by muting an online chat in the computer simulation and altering an avatar associated with the player to indicate that the player is having a conversation. In addition, or alternatively, the processor can be configured to execute the at least one privacy-preserving technique within the computer simulation at least in part by pausing video in a multiplayer chat. Yet again, the processor may be configured to execute the at least one privacy-preserving technique within the computer simulation at least in part by obscuring at least the lips of the player in video of a multi-player chat, and/or by reducing audio of the computer simulation. Text may be presented during the conversation representing dialog in the computer simulation.

In some examples, the processor can be configured to automatically transcribe dialog from the computer simulation and/or from a multiplayer chat to produce text, and after the conversation ends, present the text on at least one display.

In another aspect, a device includes at least one computer storage that is not a transitory signal and that in turn includes instructions executable by at least one processor to receive indication of a conversation between a player of a computer simulation and at least one entity. The conversation is not an online chat within the computer simulation. The instructions are executable to, responsive to the indication, implement at least one privacy-preserving technique with respect to the conversation so that participants in the computer simulation who are not the entity cannot eavesdrop on the conversation.

In another aspect, a method includes identifying a conversation between at least one player in a computer simulation and at least one entity, and altering at least one aspect related to the computer simulation such that participants in the computer simulation who are not the entity cannot apprehend the conversation.

The details of the present application, both as to its structure and operation, can be best understood in reference to the accompanying drawings, in which like reference numerals refer to like parts, and in which:

DETAILED DESCRIPTION

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, extended reality (XR) headsets such as virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google, or a Berkeley Software Distribution or Berkeley Standard Distribution (BSD) OS including descendants of BSD. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may be used that may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website or gamer network to network members.

A processor may be a single- or multi-chip processor that can execute logic by means of various lines such as address lines, data lines, and control lines and registers and shift registers.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together.

Figure 1:
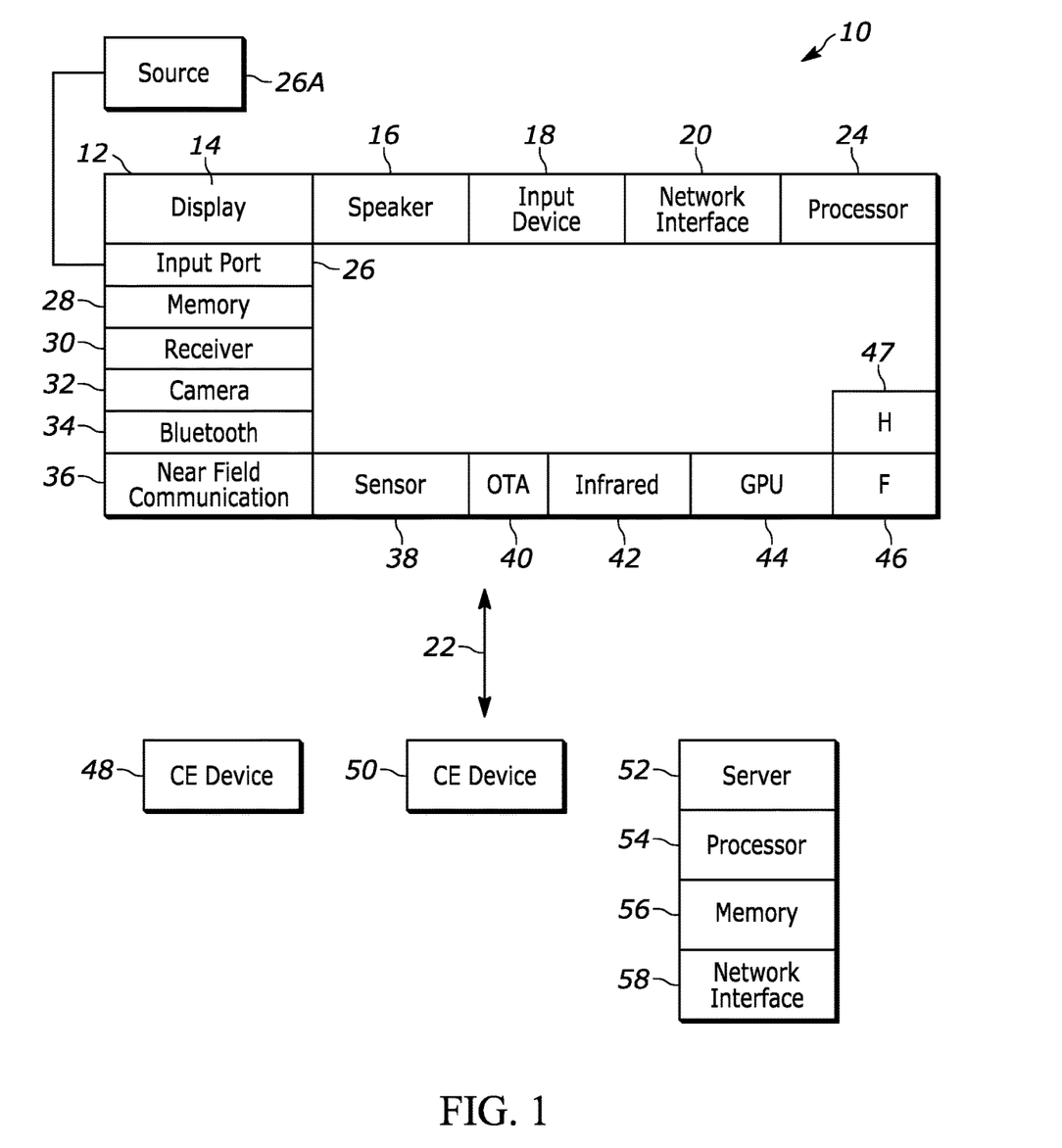
FIG. 1 is a block diagram of an example system in accordance with present principles.

Referring now to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to a theater display system which may be projector-based, or an Internet-enabled TV with a TV tuner (equivalently, set top box controlling a TV). The AVD 12 alternatively may also be a computerized Internet enabled ("smart") telephone, a tablet computer, a notebook computer, a head-mounted device (HMD) and/or headset such as smart glasses or a VR headset, another wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some, or all of the components shown. For example, the AVD 12 can include one or more touch-enabled displays 14 that may be implemented by a high definition or ultra-high definition "4K" or higher flat screen. The touch-enabled display(s) 14 may include, for example, a capacitive or resistive touch sensing layer with a grid of electrodes for touch sensing consistent with present principles.

The AVD 12 may also include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a universal serial bus (USB) port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be a separate or integrated set top box, or a satellite receiver. Or the source 26a may be a game console or disk player containing content. The source 26a when implemented as a game console may include some or all of the components described below in relation to the CE device 48.

The AVD 12 may further include one or more computer memories/computer-readable storage media 28 such as disk-based or solid-state storage that are not transitory signals, in some cases embodied in the chassis of the AVD as stand-alone devices or as a personal video recording device (PVR) or video disk player either internal or external to the chassis of the AVD for playing back AV programs or as removable memory media or the below-described server. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24.

Continuing the description of the AVD 12, in some embodiments the AVD 12 may include one or more cameras 32 that may be a thermal imaging camera, a digital camera such as a webcam, an IR sensor, an event-based sensor, and/or a camera integrated into the AVD 12 and controllable by the processor 24 to gather pictures/images and/or video in accordance with present principles. Also included on the AVD 12 may be a Bluetooth® transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 that provide input to the processor 24. For example, one or more of the auxiliary sensors 38 may include one or more pressure sensors forming a layer of the touch-enabled display 14 itself and may be, without limitation, piezoelectric pressure sensors, capacitive pressure sensors, piezoresistive strain gauges, optical pressure sensors, electromagnetic pressure sensors, etc. Other sensor examples include a pressure sensor, a motion sensor such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command). The sensor 38 thus may be implemented by one or more motion sensors, such as individual accelerometers, gyroscopes, and magnetometers and/or an inertial measurement unit (IMU) that typically includes a combination of accelerometers, gyroscopes, and magnetometers to determine the location and orientation of the AVD 12 in three dimension or by an event-based sensors such as event detection sensors (EDS). An EDS consistent with the present disclosure provides an output that indicates a change in light intensity sensed by at least one pixel of a light sensing array. For example, if the light sensed by a pixel is decreasing, the output of the EDS may be −1; if it is increasing, the output of the EDS may be a +1. No change in light intensity below a certain threshold may be indicated by an output binary signal of 0.

The AVD 12 may also include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included. One or more haptics/vibration generators 47 may be provided for generating tactile signals that can be sensed by a person holding or in contact with the device. The haptics generators 47 may thus vibrate all or part of the AVD 12 using an electric motor connected to an off-center and/or off-balanced weight via the motor's rotatable shaft so that the shaft may rotate under control of the motor (which in turn may be controlled by a processor such as the processor 24) to create vibration of various frequencies and/or amplitudes as well as force simulations in various directions.

A light source such as a projector such as an infrared (IR) projector also may be included.

In addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. The HMD may include a heads-up transparent or non-transparent display for respectively presenting AR/MR content or VR content (more generally, extended reality (XR) content). The HMD may be configured as a glasses-type display or as a bulkier VR-type display vended by computer game equipment manufacturers.

In the example shown, only two CE devices are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other illustrated devices over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown or nearby.

The components shown in the following figures may include some or all components shown in herein. Any user interfaces (UI) described herein may be consolidated and/or expanded, and UI elements may be mixed and matched between UIs. The logic shown in flow charts herein may be executed by any one or more of the processors discussed herein.

Present principles may employ various machine learning models, including deep learning models. Machine learning models consistent with present principles may use various algorithms trained in ways that include supervised learning, unsupervised learning, semi-supervised learning, reinforcement learning, feature learning, self-learning, and other forms of learning. Examples of such algorithms, which can be implemented by computer circuitry, include one or more neural networks, such as a convolutional neural network (CNN), a recurrent neural network (RNN), and a type of RNN known as a long short-term memory (LSTM) network. Support vector machines (SVM) and Bayesian networks also may be considered to be examples of machine learning models. In addition to the types of networks set forth above, models herein may be implemented by classifiers.

As understood herein, performing machine learning may therefore involve accessing and then training a model on training data to enable the model to process further data to make inferences. An artificial neural network/artificial intelligence model trained through machine learning may thus include an input layer, an output layer, and multiple hidden layers in between that that are configured and weighted to make inferences about an appropriate output.

Figure 2:
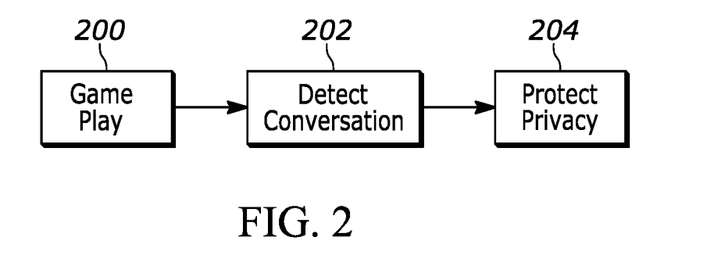
FIG. 2 illustrates example overall logic in example flow chart format.

FIG. 2 illustrates overall logic that can be implemented by any one or more of the devices and/or processors described herein. During conduct of a computer simulation such as play of a computer game at block 200, a conversation may be detected at block 202 between a game participant and another person, either a non-participant or another game participant. It is to be understood that such a conversation is not a multiplayer game chat, but a communication outside the game system. Note further that the multiplayer game chat need not happen directly on a game console, but could be implemented on a laptop or cellphone using skype or discord and integrated with this overall system, so that if a higher priority conversation comes in, ALL multiplayer chats are suspended and transcribed.

The conversation may be person-to-person voice, or through text such as short message service (SMS), or with a virtual person such as a digital assistant), etc. Responsive to detecting the conversation, at block 204 the privacy of the conversation is protected.

Figure 3:
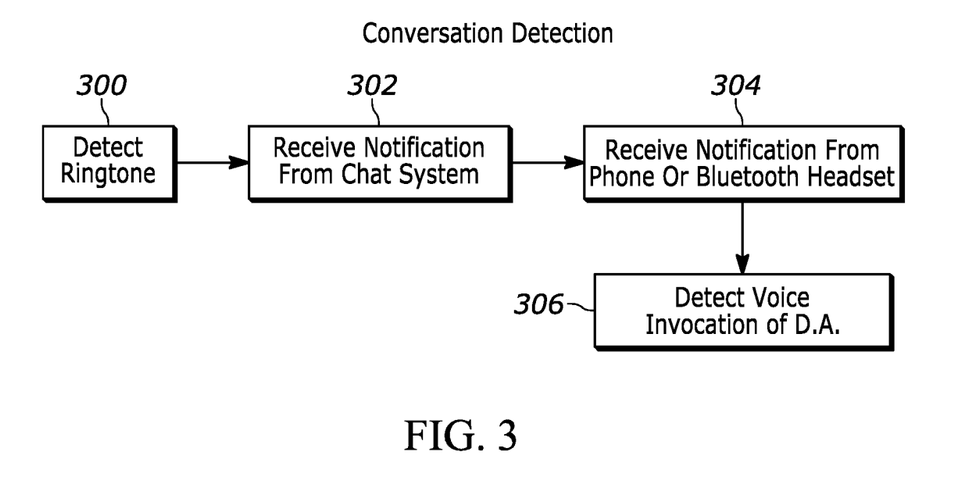
FIG. 3 illustrates example logic in example flow chart format for detecting a conversation during game play consistent with present principles.

FIG. 3 illustrates details of detecting a conversation using one or more techniques. Block 300 for example indicates detection of a non-voice audible signal such as a ringtone of a phone. The ringtone may be picked up by a microphone on, e.g., a game controller or other device, or may be reported directly from the phone to the game engine if the systems are integrated. The system can be aware of the ringtone of the player's phone as well as common ringtones such as those for Skype calls, Facetime, Viber, Discord and WhatsApp. Also included may be apps commonly used in work environments such as MS Teams, Zoom, Slack, etc. to protect potential confidential information. To this end, a ML model trained on data comprising various audible signals with ground truth labels as to what the signals represent may be used to process a detected audible signal or report thereof to determine if the detected signal is indicative of the start of a conversation. Such a ML mode may be trained to recognize an unknown ringtone. Another example is the use of speech to text when replying to a text on a device, which may cause a "ding" or other tone before and after the transcription, indicating that the user is now busy texting someone.

Block 302 indicates that in addition or alternatively to block 300, a game engine/console or other system executing the logic may be integrated directly with the various non-game chat systems that notify the game engine/console of a chat conversation. For instance, Skype can notify a game console executing a game engine through a network message when a player enters and exits a Skype call. This can be true regardless of where Skype is running (on a phone, laptop, or directly on the game console.)

Yet again, block 304 indicates that a game engine/console can be integrated with and triggered directly by the phone's operating system or that of a Bluetooth headset to receive notification therefrom of a conversation. For instance, a Bluetooth headset can broadcast a message whenever it initiates a call (inbound or outbound) to a local network that the person is engaged in a call. Similarly, the operating system of a cell phone can do the same.

Still further, block 306 indicates that voice invocation of a person (such as "hello") or a virtual person such as a digital assistant may be used to determine that a conversation is beginning. For example, a person may invoke a digital assistant with a known invocation phrase. A ML model trained on voice invocations with ground truth labels may be used to detect such triggers. As a further example, names of people the user lives with may be recognized in speech to identify that the user is speaking to the recognized person and not someone in the game. Or alternatively upon detecting a person's name in speech, the name can be checked to determine if the name is associated with a player or character in the game and if not, audio may be muted. People's names could act as "wake-words" for making a safe space for the gamer.

Figure 4:
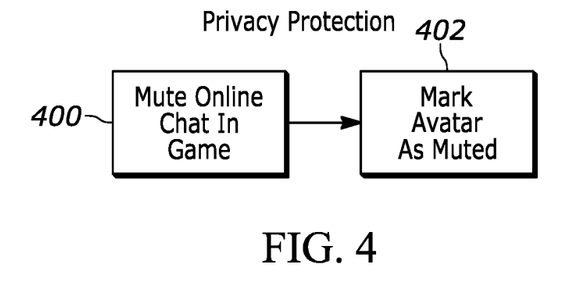
FIG. 4 illustrates example logic in example flow chart format for a first technique for privacy protection.
Figure 5:
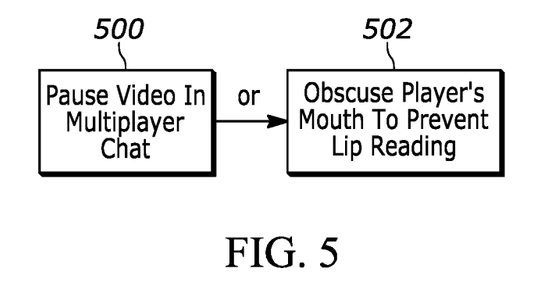
FIG. 5 illustrates example logic in example flow chart format for a second technique for privacy protection.
Figure 6:
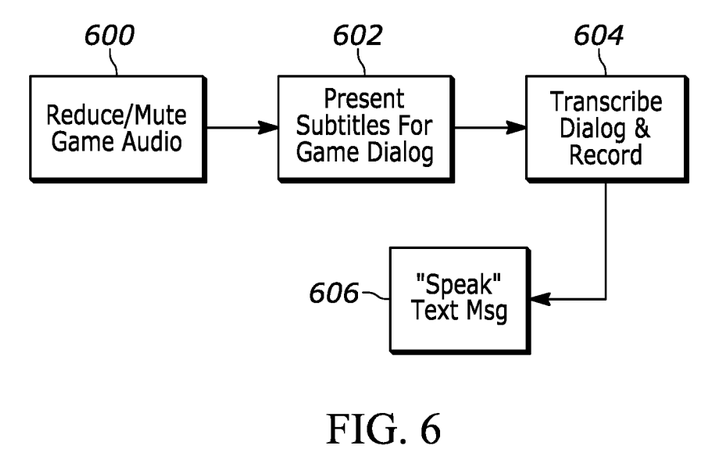
FIG. 6 illustrates example logic in example flow chart format for a third technique for privacy protection.

FIGS. 4-6 illustrate logic executable by any one or more of the devices and/or processors herein to help players on a call in a number of ways, responsive to detection of communication having been identified as described above. Commencing at block 400 in FIG. 4, any online chat in a game is automatically muted so as not to compete with the communication or conversation detected outside the game environment. Moving to block 402, the conversing player's avatar is marked as "on the phone" so other players know why they can no longer hear that player.

FIG. 5, block 500 indicates that if the player is using video in a multiplayer chat, the video can either be paused, or at block 502 the player's face or lips in the video of the multiplayer chat are obscured so lip reading of the non-game conversation by game participants is not possible. In addition to obscuring just the mouth, other facial features may be obscured to obscure any indications of emotion such as anger. Indeed, the video of the conversing person whose conversation privacy is sought to be protected may be replaced with a deep fake video of the person appearing to behave with equanimity. Or, the replacement video may be of the conversing player in a Twitch recording of a live stream of the person playing the game. Yet again, the video of the conversing person may be replaced by an icon, a game character, or a virtual avatar that the player previously created or chose.

Figure 7:
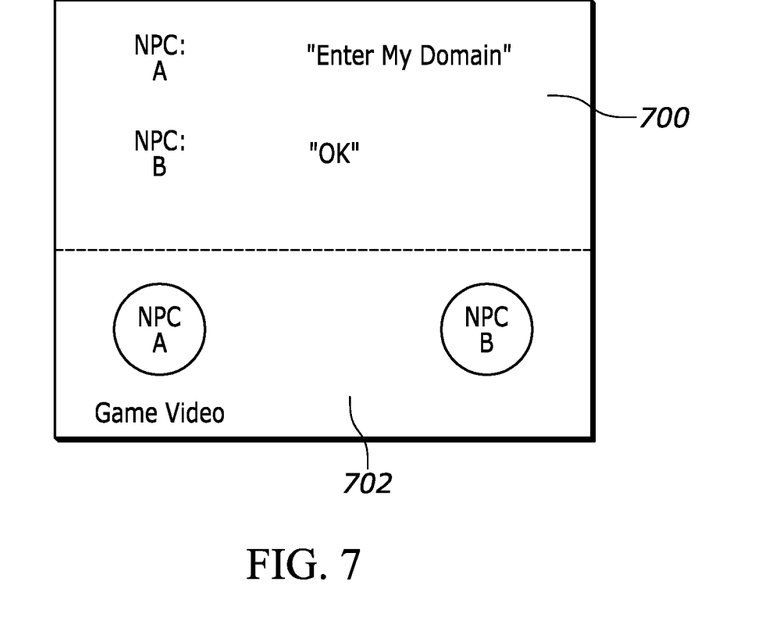
FIG. 7 illustrates an example screen shot from an example computer simulation such as a computer game consistent with privacy protection techniques described herein.

As still further techniques for preserving privacy, FIG. 6, block 600 indicates that in-game audio can be reduced in volume or completely muted to not interfere with the call or interaction with another person or digital assistant. Block 602 indicates that subtitles can be presented on the player's display of any in-game dialog so that the player can read the dialog while conversing. Referring briefly to FIG. 7, such subtitles 700 may be presented on a display showing game play video 702. Subtitles can be generated and appear for the multiplayer chat as well, so that the player can still read what other game participants are saying as the conversing person is engaged in the non-game conversation.

Figure 8:
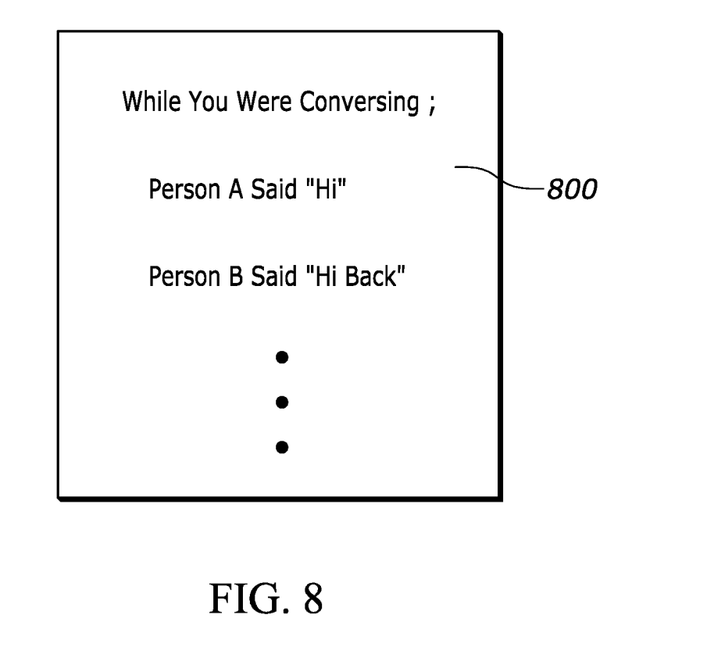
FIG. 8 illustrates an example screen shot from an example computer simulation such as a computer game consistent with privacy protection techniques described herein.

Block 604 of FIG. 6 indicates that any in-game dialog or multiplayer chat dialog can be transcribed and recorded that the conversing person can review it later, as shown at 800 in FIG. 8. Proceeding to block 606 of FIG. 6, in the case of a non-game conversation consisting of text message (SMS, Whatsapp, etc.), the message can be played on a speaker of the conversing player's system while the game audio is reduced. Also, any in-game multiplayer chat may be muted during this time so that the players do not hear this message. The SMS message may be presented on a display.

Note that if a salient game event is about to occur, the game engine may employ a proxy to alert the conversing player that immediate attention is needed. The alert may be in haptic form such as a vibration of a watch that is communicating with the game engine, or in visual form such as blinking lamps or the display itself, or in audible form such as playing an alarm on a speaker of the game system, phone, or other device.

While the particular embodiments are herein shown and described in detail, it is to be understood that the subject matter which is encompassed by the present invention is limited only by the claims.

What is claimed is:

1. An assembly, comprising:
at least one processor configured with instructions to:
during presentation of a computer simulation, detect that a conversation outside the computer simulation between a player of the computer simulation and at least one other person has commenced at least in part by identifying at least one signal from a telephone's operating system or from a Bluetooth headset or from both a telephone's operating system and from a Bluetooth headset; and responsive to detecting that a conversation between a player of the computer simulation and at least one other person has commenced, execute at least one privacy-preserving technique within the computer simulation to preserve privacy of the conversation.

2. The assembly of Claim 1, wherein the processor is configured to detect that a conversation between a player of the computer simulation and at least one other person has commenced at least in part by detecting an audible sound.

3. The assembly of claim 2, wherein the audible sound comprises at least one phone ring tone.

4. The assembly of Claim 1, wherein the processor is configured to detect that a conversation between a player of the computer simulation and at least one other person has commenced at least in part by receiving from a chat system at least one indication of the conversation.

5. The assembly of Claim 1, wherein the processor is configured to execute the at least one privacy-preserving technique within the computer simulation at least in part by muting an online chat in the computer simulation and altering an avatar associated with the player to indicate that the player is having a conversation.

6. The assembly of Claim 1, wherein the processor is configured to execute the at least one privacy-preserving technique within the computer simulation at least in part by pausing video in a multiplayer chat.

7. The assembly of Claim 1, wherein the processor is configured to execute the at least one privacy-preserving technique within the computer simulation at least in part by obscuring at least the lips of the player in video of a multi-player chat.

8. The assembly of Claim 1, wherein the processor is configured to execute the at least one privacy-preserving technique within the computer simulation at least in part by reducing audio of the computer simulation.

9. The assembly of claim 8, wherein the processor is configured to:
present text during the conversation representing dialog in the computer simulation.

10. The assembly of Claim 1, wherein the processor is configured to:
automatically transcribe dialog from the computer simulation and/or from a multiplayer chat to produce text; and
after the conversation ends, present the text on at least one display.

11. An assembly, comprising:
at least one processor configured with instructions to:
during presentation of a computer simulation, detect that a conversation outside the computer simulation between a player of the computer simulation and at least one other person has commenced at least in part by identifying voice activation of at least one digital assistant; and
responsive to detecting that a conversation between a player of the computer simulation and at least one other person has commenced, execute at least one privacy-preserving technique within the computer simulation to preserve privacy of the conversation.

12. The assembly of claim 11, wherein the instructions are executable to:
execute the at least one privacy-preserving technique at least in part by muting an online chat in the computer simulation.

13. The assembly of claim 11, wherein the instructions are executable to:
execute the at least one privacy-preserving technique at least in part by obscuring at least the lips of the player in video of a multi-player chat.

* * * * *